Aug. 28, 1962   G. F. CLIFFORD   3,050,960
SOFT ICE-CREAM MACHINES
Filed Sept. 6, 1960
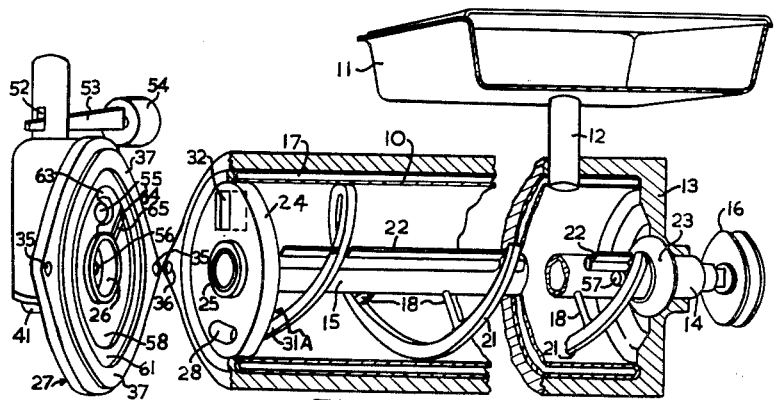
FIG. 1
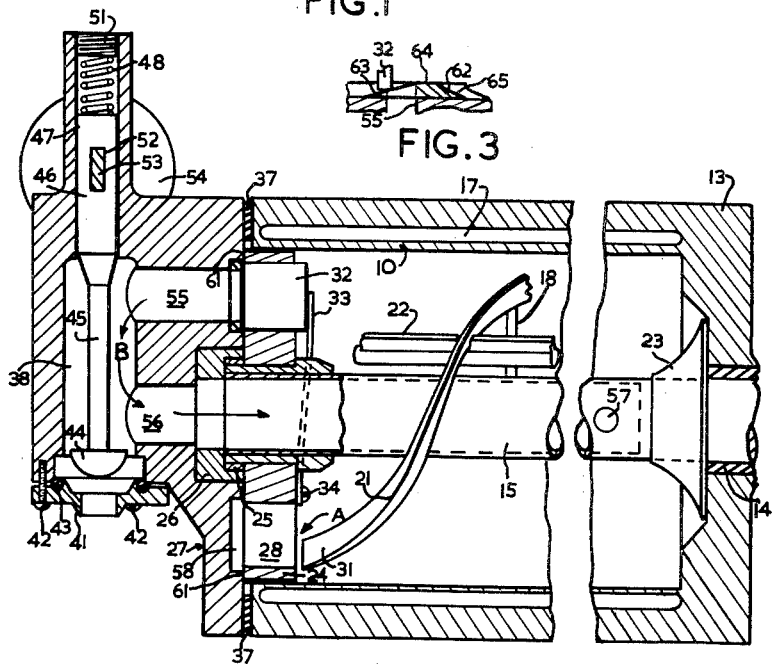
FIG. 3
FIG. 2
Inventor
George Fitzsimon Clifford
By
Michael S. Striker
Attorney United States Patent Office 3,050,960
Patented Aug. 28, 1962

3,050,960
SOFT ICE-CREAM MACHINES
George Fitzsimon Clifford, Arncliffe, New South Wales, Australia, assignor to Jersey Creme Holdings Pty. Limited, Sydney, Australia, a company of New South Wales
Filed Sept. 6, 1960, Ser. No. 54,040
Claims priority, application Australia Sept. 14, 1959
4 Claims. (Cl. 62—342)

The present invention relates to soft-ice-cream machines and more particularly to machines used for freezing and dispensing a form of ice-cream known as "soft ice-cream" or "soft serve ice-cream."

Soft ice-cream machines are well known and consist generally in a horizontal cylinder which forms a container for the ice-cream, around which there is provided some form of refrigerating device by which the ice-cream in the cylinder is maintained at a low temperature. Within the cylinder there is usually an arrangement of blades rotated on a central shaft which enters one end of the cylinder through a gland and is driven by an electric motor, the blade serving to scrape the internal surface of the cylinder clear of frozen material and also to urge the material in the cylinder towards one end of it. At the end to which the material is forced the cylinder is provided with a removable closure and also with some form of delivery valve by means of which ice-cream may be removed from the cylinder and served into cones or other receptacles.

A problem which occurs with such machines is that from time to time material in the vicinity of the valve tends to become frozen hard and to block the valve, thus preventing the withdrawal of ice-cream from the machine. Machines in use hitherto are controlled manually, that is to say, the valve is operated by a person in attendance on the machine and in the event of the valve becoming blocked the attendant can take steps to clear it, although these are inconvenient and time consuming. It is however proposed to construct a soft ice-cream machine arranged to discharge ice-cream on the insertion of a coin, the machine being unattended. It will be appreciated that any blockage of the valve due to the freezing of the material would put the machine out of action until it could be serviced. The object of the present invention is to provide a form of construction which will assist in preventing the freezing of material adjacent the valve in either attended or coin-freed machines.

According to the invention there is provided in a soft ice-cream machine the combination of a freezing cylinder, a shaft mounted co-axially with and for rotation within said freezing cylinder, means carried on said shaft to agitate ice cream in the said cylinder and urge it towards one end thereof, a removable closure member secured to and sealing said one end of the said cylinder, a valve chamber in said closure member, a delivery outlet from said valve chamber, a valve member in said valve chamber arranged to control said delivery outlet, first and second passages in said closure member connecting the interior of the freezing cylinder and the valve chamber, impeller means constructed and arranged so that on rotation of said shaft ice-cream is propelled to said delivery outlet from said cylinder by way of said first passage and said valve chamber, said passages being arranged in such a manner that on rotation of said shaft, when said valve member is in a position to close said delivery outlet, ice-cream is passed continuously from said cylinder past said valve member and is returned to the cylinder by way of the said second passage.

In order that the invention may be better understood and put into practice a preferred form thereof is hereinafter described, by way of example, with reference to the accompanying drawings, in which:

FIG. 1 is a perspective view of the freezing cylinder and other parts of a soft ice-cream machine incorporating the invention, the wall of the cylinder being shown cut away, FIG. 2 is a median sectional elevation of the construction shown in FIG. 1 with the closure member secured in position, FIG. 3 is a section of a portion of FIG. 1 through cam 62 to show the construction and arrangement of the cam.

As the general construction of soft ice-cream machines is well known to those skilled in the art, it is unnecessary to illustrate and describe a complete machine and the following description relates only to those parts relevant to an understanding of the present invention.

In the construction shown the freezing cylinder 10 is fed with soft ice-cream mix from a reservoir 11 through the tube 12, all of which may be of conventional construction. In the end wall 13 of the cylinder 10 there is provided a plain bearing 14 for the hollow shaft 15 which may be driven through the pulley 16. The cylinder 10 is surrounded by a chamber 17 through which an alcohol-water or other refrigerant is passed. The refrigerant is cooled and supplied to the chamber 17 by conventional refrigerating means which are not shown and acts to maintain the temperature of an ice-cream mix in the cylinder at about 22° F.

The hollow shaft 15 is mounted co-axially with the cylinder 10 and has attached to it, by radial arms 18, a helically developed dasher blade 21 of substantially conventional construction. The dasher blade 21 supports a wiper blade 22 which is pressed against the inner surface of the cylinder 10 and serves to scrape off any ice-cream adhering to it. The use of a wiper blade is conventional, such blades are however of steel whereas it is preferred to use nylon which enables a softer metal to be used for the cylinder 10. Escape of ice-cream mix past the bearing 14 is prevented by means of the rubber cup 23 which fits closely around the shaft 15 and bears against the inner face of the end wall 13 in such a manner that any pressure applied to the cup 23 from inside the cylinder by ice-cream therein acts to reinforce the sealing action.

At the other end of the shaft 15 is attached a nylon disc 24 which rotates with the shaft and the periphery of which is a close fit within the cylinder 10. A portion 25 of the shaft 15 projects beyond the nylon disc 24 and is received in a nylon bush 26 in the closure member 27, the construction of which is described below.

Passing through the nylon disc 24 is a hole 28. This hole passes through the disc 24 at an angle to its axis, the direction of the hole corresponding approximately to the direction of the end portion 31 of the dasher blade 21. The purpose of this arrangement is described below. Diametrically opposite the hole 28 is a wiper member 32 in the form of a rectangular block of nylon which is a sliding fit in a rectangular aperture formed in the disc 24. The inner face of the block 32 is in contact with the spring arm 33 held in position on the disc 24 by the screw 34.

The closure member 27 is turned through a slight angle in FIG. 1, to show its construction more clearly. In use it is secured to the open end of the cylinder 10 in the position shown in FIG. 2 by means of bolts (not shown) which pass through holes 35 in the closure member and screw into corresponding threaded holes 36 in the cylinder 10. The joint between the closure member 27 and the end of the cylinder is sealed by the flexible washer 37. The closure member is of fairly massive construction to avoid distortion which might result in leakage between the closure member and the cylinder and is conveniently formed by machining a brass casting.

Within the closure member 27 is a valve chamber 38 having at its lower end a delivery outlet 41 consisting of a ring having a central orifice which is secured to the closure member by the screws 42. An O-ring 43 is employed to seal the joint between the closure member 27 and the delivery outlet 41. Within the valve chamber 38 is a valve member 44 which is in the form of a hemispherical rubber head on the end of the stem 45. The valve member 44 is arranged to control the delivery outlet 41, that is to say, the valve member may be lowered to seat in the aperture in the delivery outlet 41 and close it or it may be raised to the position shown in FIG. 2 to open it.

The stem 45 has an enlarged upper portion 46 which is slidable in a bore 47 formed in the closure member 27. The stem 45 is spring loaded by the spring 48 which acts between the upper end of the stem and a screw cap 51 screwed into the end of the bore 47, the spring acting to hold the valve member 44 firmly into contact with the delivery outlet 41.

A slot 52 passes through the closure member and the portion 46 of the stem 45. A wedge 53 attached to the armature of a solenoid 54 projects through the slot 52. The wedge may be moved laterally into or out of the slot by energising or de-energising the solenoid and the arrangement is such that when the wedge is moved into the slot the valve member 44 is lifted against the spring 48 to open the delivery outlet 41, whereas when the wedge is withdraw the valve member 44 is moved downwardly under the pressure of the spring 48 to close the orifice in the delivery outlet 41.

In the closure member 27 is a first passage 55 connecting the interior of the cylinder 10 to the valve chamber 38, and a second passage 56 which also connects the valve chamber to the interior of the cylinder. The passage 56 connects with the internal bore in the shaft 15 and this leads into the cylinder 10 by way of a hole 57 formed in the wall of the shaft 15.

In the inner face of the closure member 27 is an annular channel 58 into which the wiper member 32 fits closely. The outer wall of the channel is formed by the shoulder 61 against which the outer edge of the face of the nylon disc bears as may be seen in FIG. 2. The annular channel 58 is thus completely closed except for the entrance to the passage 55 which is included within the channel. Around the entrance to the passage is formed a cam 62 (see FIG. 3) which has one sloping face 63 surrounding the entrance, a flat face 64 and a second sloping face 65. The arrangement of these is shown most clearly in FIG. 3 and the function of the cam 62 is described below.

During the operation of the machine an ice-cream mix is fed into the cylinder 10 from the reservoir 11 and the shaft 15 is rotated by means of a suitable electric motor (not shown). The ice-cream is agitated by the dasher blade 21 and urged towards the left hand end of the cylinder 10 (as shown in FIGS. 1 and 2) in a conventional manner. The ice-cream is forced against the inner face of the nylon disc 24 and ice-cream in the space indicated at A between the end 31 of the dasher blade 21 and the nylon disc is forced through the hole 28 into the channel 58. Thus as the disc 24 is rotated the channel 58 is filled with ice-cream from the hole 28. The wiper member 32 however being a close fit in the channel, sweeps this ice-cream along in front of it. As the face of the channel 58 is closed by the nylon disc 24 the ice-cream can escape only through the passage 55 into the valve chamber 38.

Assuming that the outlet orifice 41 is closed by the valve member 44, once the valve chamber 38 is full ice-cream will pass through the passage 56 as indicated by the arrow B (FIG. 2) along the internal bore of the shaft 15 and back into the interior of the cylinder 10 through the hole 57. There is thus a continuous circulation of ice-cream through the valve chamber 38 and past the deliver outlet 41. The result of this is that the ice-cream adjacent the delivery outlet is always maintained at a temperature approximating closely to that of the ice-cream within the cylinder, thus ensuring that on operation of the machine ice-cream at a desired temperature is delivered. The circulation ensures that ice-cream does not freeze solid in the valve chamber and thus prevent the operation of the valve member 44. To obtain the best advantage from the circulation it is most desirable that the point of exit of the passage 56 from the valve chamber 38 shall be as close as possible to the orifice in the delivery outlet 41 to avoid the formation of a small pocket of ice-cream around the delivery outlet which does not take part in the general circulation.

If the delivery outlet 41 is open as shown in FIG. 2 ice-cream will pass through the orifice therein into a suitable container for as long as the outlet is maintained open. In this connection it is necessary to ensure that the hole 57 in the shaft 15 is in a position in the cylinder 10 such that the resistance to movement of the ice-cream through passage 56, shaft 15 and hole 57 is somewhat greater than the resistance offered by the orifice in the delivery outlet 41. This is to ensure that on opening the delivery outlet the circulation of ice-cream substantially ceases, so as to provide a high rate of delivery from the delivery outlet.

Generally speaking, the nearer the hole 57 is to the end wall 13 the less will be the back pressure in the passage 56. If desired more than one hole 57 may be employed and the best position for these in any given installation is found by experiment.

The embodiment of the invention described above is given by way of example only and, as will be appreciated by those skilled in the art, other embodiments of the invention within the scope of the succeeding claims may be readily devised. In particular the impeller means used for delivering ice-cream from the cylinder to the valve chamber may be varied substantially from the construction shown (for example, a small gear pump may be used) provided that it is effective to deliver ice-cream to the valve chamber through the first passage.

While it is preferred that the second passage should connect with one end of a hollow shaft, it would be feasible to connect it in some other manner to the interior of the cylinder, particularly where some other form of impeller means than that specifically described were used.

The term "soft ice-cream" is to be taken to include any similar substance such as custard which it is desired to deliver in a partly frozen condition.

What I claim is:

1. In a soft ice-cream machine the combination of a freezing cylinder, a shaft mounted co-axially with and for rotation within said freezing cylinder, means carried on said shaft to agitate ice-cream in the said cylinder and urge it towards one end thereof, a removable closure member secured to and sealing said one end of the said cylinder, a valve chamber in said closure member, a delivery outlet from said valve chamber, a valve member in said valve chamber arranged to control said delivery outlet, first and second passages in said closure member connecting the interior of the freezing cylinder and the valve chamber, impeller means constructed and arranged so that on rotation of said shaft when said delivery outlet is open, ice-cream is propelled to said delivery outlet from said cylinder by way of said first passage and said valve chamber and is delivered therefrom, and a third passage communicating with said second passage and extending through the interior of said cylinder to the other end thereof, said third passage being open in the region of the other end of said cylinder, said passages being arranged in such a manner that on rotation of said shaft, when said valve member is in a position to close said delivery outlet, ice-cream is passed continuously from said cylinder past said valve member and is returned through the cylinder by way of the said second and third passage to the other end of said cylinder.

2. In a soft ice-cream machine, in combination, a freezing cylinder; a shaft mounted coaxially with and for rotation within said freezing cylinder, said shaft being formed with an internal bore and at least one aperture communicating with said bore and opening into said cylinder adjacent one end thereof; means carried on said shaft to agitate ice-cream in said cylinder and to urge it towards the other end thereof; a closure member secured to and sealing said other end of said cylinder; a valve chamber in said closure member; a delivery outlet from said chamber; a valve member in said valve chamber arranged to control said delivery outlet; a first passage in said closure member communicating with said valve chamber and the interior of said cylinder at said other end of the latter; a second passage in said closure member communicating with said valve chamber and said bore in said shaft at said other end of said cylinder; and impeller means constructed and arranged so that on rotation of said shaft when said delivery outlet is open, ice-cream is propelled to said delivery outlet from said cylinder by way of said first passage and said valve chamber and is delivered therefrom, and when said delivery outlet is closed by said valve member, ice-cream is passed continuously past said valve member and is returned through said second passage, said bore in said shaft and said opening communicating with said bore to said one end of said cylinder.

3. In a soft ice-cream machine the combination claimed in claim 2 wherein said impeller means comprises a disc attached at one end of said shaft and maintained in contact with said closure member, an opening passing through said disc, a spiral dasher blade attached to said shaft and terminating at one end adjacent said opening in such a manner that on rotation of said shaft the end of the dasher blade acts to cause ice-cream to pass through said opening, an annular channel formed in the inner face of said closure member, said channel including the entry to said first passage, a spring-loaded wiper member on said disc arranged to fit closely within and move around said channel, means in the channel adjacent the entry to said first passage to cause ice-cream in said channel carried around by said wiper member to be received into said first passage and to displace said wiper member resiliently out of said passage on its passing the entry to said passage.

4. In a soft ice-cream machine, in combination, a freezer cylinder; agitating means in said freezer cylinder to agitate ice-cream in said cylinder and to urge the ice-cream against one end of said cylinder, said agitating means including a shaft coaxial with said cylinder; a disc extending transversely through said one end of said freezer cylinder and being mounted on said shaft for rotation therewith in one direction, said disc having an outer end face and being formed with an opening extending from said outer end face in axial direction through said disc; a closure member closing said one end of said freezer cylinder and being removably mounted on the latter, said closure member having an inner end face in contact with said outer end face of said disc and being formed in said inner end face with an annular channel coaxial with said shaft and communicating with said opening through said disc; a valve chamber in said closure member; a delivery outlet communicating with said chamber; a valve member in said chamber arranged to control said delivery outlet; first passage means in said closure member communicating with said annular channel and said valve chamber; second passage means communicating with said valve chamber and extending through said shaft to the interior of said freezer cylinder and communicating with the interior of the latter at a location distant from said one end thereof; a wiper member carried by said disc for movement therewith and having an end portion fitting in said channel; resilient means operatively connected to said wiper member and tending to keep said end portion thereof in said channel; and blocking means extending transversely through said channel adjacent and, in direction of rotation of said disc, following said first passage means to cause ice-cream in said channel carried around by said wiper member to enter said first passage and to displace said wiper member out of said channel so that it may pass over said blocking means.

References Cited in the file of this patent

UNITED STATES PATENTS

| | | |
|---|---|---|
| 2,037,645 | Vroom | Apr. 14, 1936 |
| 2,059,485 | Payne | Nov. 3, 1936 |
| 2,079,430 | Bargeboer | May 4, 1937 |
| 2,210,366 | Godfrey | Aug. 6, 1940 |
| 2,740,262 | Stalkup | Apr. 3, 1956 |
| 2,783,087 | Rainson | Feb. 26, 1957 |
| 2,784,565 | Stalkup | Mar. 12, 1957 |